US006950097B1

(12) United States Patent
Hojabri

(10) Patent No.: US 6,950,097 B1
(45) Date of Patent: Sep. 27, 2005

(54) VIDEO DISPLAY INTERFACE CONTROLLER FOR HOST VIDEO DISPLAY UNIT

(75) Inventor: Peyman Hojabri, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 298 days.

(21) Appl. No.: 10/307,856

(22) Filed: Dec. 2, 2002

(51) Int. Cl.[7] .............................................. G09G 1/02
(52) U.S. Cl. ...................... 345/204; 345/10; 345/11; 345/22; 345/565; 345/581; 345/594; 345/600; 345/619; 348/577; 348/649; 348/673; 348/687; 715/740; 715/833
(58) Field of Search ........................... 345/10, 11, 22, 345/565, 581, 594, 600, 619, 204; 348/577, 348/649, 673, 687; 715/740, 833

(56) References Cited

U.S. PATENT DOCUMENTS

| | | | | |
|---|---|---|---|---|
| 5,051,827 A | * | 9/1991 | Fairhurst | 348/180 |
| 5,227,881 A | * | 7/1993 | Wess et al. | 348/512 |
| 5,270,821 A | * | 12/1993 | Samuels | 348/552 |
| 5,353,063 A | * | 10/1994 | Yagisawa et al. | 348/426.1 |
| 5,457,473 A | * | 10/1995 | Arai et al. | 345/10 |
| 5,499,040 A | * | 3/1996 | McLaughlin et al. | 715/823 |
| 5,786,864 A | * | 7/1998 | Yamamoto | 348/473 |
| 6,002,447 A | * | 12/1999 | Rumreich et al. | 348/606 |
| 6,295,053 B1 | | 9/2001 | Tsai et al. | |
| 6,342,927 B1 | * | 1/2002 | Kimoto et al. | 348/569 |
| 6,577,301 B1 | | 6/2003 | Tsai et al. | |
| 6,606,100 B1 | | 8/2003 | Lonoce et al. | |
| 6,661,411 B1 | | 12/2003 | Tsai et al. | |
| 2002/0063666 A1 | * | 5/2002 | Kang et al. | 345/87 |

* cited by examiner

Primary Examiner—Richard Hjerpe
Assistant Examiner—Alexander S. Beck
(74) Attorney, Agent, or Firm—Vedder Price Kaufman & Kammholz, P.C.

(57) ABSTRACT

A video display interface controller for a host video display unit in which control signals multiplexed with component video signals are extracted and routed according to included address information. Control data associated with one or more local addresses is used for initial processing of the component video signals while control data associated with one or more remote addresses is used for subsequent signal processing.

10 Claims, 5 Drawing Sheets

FIG. 6

VIDEO DISPLAY INTERFACE CONTROLLER FOR HOST VIDEO DISPLAY UNIT

BACKGROUND OF THE INVENTION

1. Field of the Invention

The present invention relates to video displays, and in particular, to video display controllers for controlling the signal and display characteristics of a video image.

2. Description of the Related Art

Video display units require some form of control for establishing and maintaining various video signal characteristics, as well as various image display characteristics. Such control can be of even more critical importance in the context of computer generated video images, particularly where such images involve detailed or complex graphical information. Additionally, video display units, or monitors, for computers typically include some form of on screen display (OSD) in which the various video signal or display characteristics to be controlled are listed along with some form of iconic information for aiding the user to make any desired adjustments by way of various control buttons on the housing for the display unit. The circuitry for such controls is typically included as part of the internal circuitry of the display unit itself, with some form of memory circuitry for retaining base parameter characteristics or values, while also allowing for retention of modified characteristics or value information following adjustments by the user of the display unit.

The use of such circuitry internal to the display unit itself has a number of disadvantages, not the least of which is costs associated with the design and manufacturing of such circuitry as part of the display unit. Additionally, while such circuitry may be made programmable, such programmability is limited in the sense that the user interface generally involves some form of mechanical or electromechanical switches on the housing of the display unit, thereby limiting the degree of programmability as well as the convenience of actually performing any programming steps through such switches. Accordingly, it would be desirable to have a more flexible technique for programming and controlling video signal and image characteristics of a display unit without requiring manual operation of mechanical or electromechanical switches as part of the user interface.

SUMMARY OF THE INVENTION

In accordance with the presently claimed invention, a video display interface controller for a host video display unit extracts control signals multiplexed with component video signals and routes them according to included address information. Control data associated with one or more local addresses is used for initial processing of the component video signals while control data associated with one or more remote addresses is used for subsequent signal processing.

In accordance with one embodiment of the presently claimed invention, a video display interface controller for a host video display unit includes signal terminals and interface circuitry. A first plurality of signal terminals convey a plurality of multiplexed input signals including a plurality of component video signals and a first plurality of control signals, wherein the first plurality of control signals include address information and data information, and the address information corresponds to at least one local address and at least one remote address. A second plurality of signal terminals convey a second plurality of control signals corresponding to a portion of the data information related to the at least one local address. A third plurality of signal terminals convey a third plurality of control signals including another portion of the data information and a portion of the address information corresponding to the at least one remote address. The interface circuitry, coupled to the first, second and third pluralities of signal terminals, receives and processes the plurality of multiplexed input signals to provide the second and third pluralities of control signals.

In accordance with another embodiment of the presently claimed invention, a method for controlling a video display interface for a host video display unit includes:

receiving a plurality of multiplexed input signals including a plurality of component video signals and a first plurality of control signals, wherein the first plurality of control signals includes address information and data information, and the address information corresponds to at least one local address and at least one remote address; and processing the plurality of multiplexed input signals and generating a second plurality of control signals corresponding to a portion of the data information related to the at least one local address, and a third plurality of control signals including another portion of the data information and a portion of the address information corresponding to the at least one remote address.

BRIEF DESCRIPTION OF THE DRAWINGS

FIG. 6 illustrates how a user-defined window can be opened and manipulated within a computer generated video image in accordance with the presently claimed invention.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
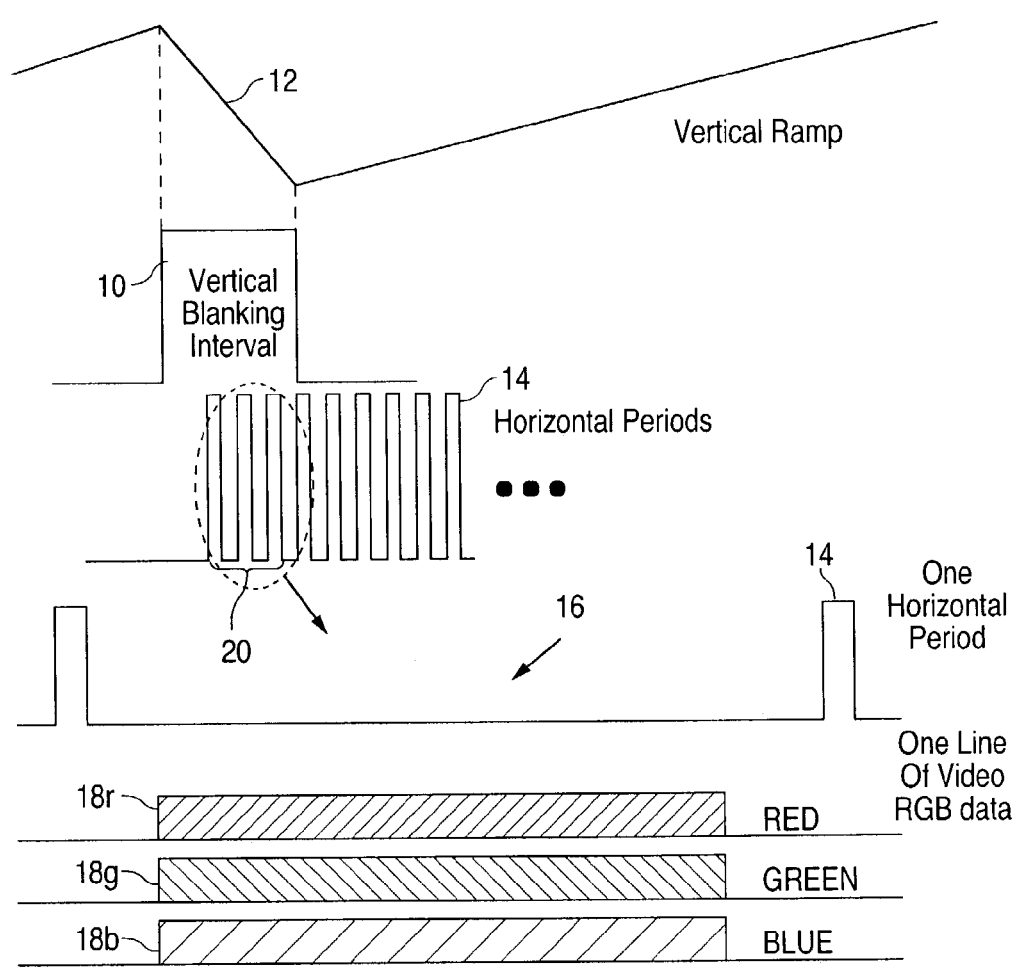
FIG. 1 is a signal diagram depicting various signals associated with the vertical and horizontal sweep intervals for a video display.

Referring to FIG. 1, as is well known in the art, every video display image has what is referred to as a vertical blanking interval 10 corresponding to that interval of time during which the vertical ramp signal 12 is reversed in slope to cause the video imaging mechanism (e.g., electron guns in a cathode ray tube display) to return to its initial scanning location. During this time interval 10, no video image information is displayed, thereby making such time interval 10 available for the transmission of other signal information, such as digitized data.

During this time interval 10, the horizontal synchronization pulses 14 continue. The time interval 16 between the horizontal synchronization pulses 14 is available for transmission of video image or other information. In the case of component video signals 18, the individual video signal components, such as red 18$r$, green 18$g$ and blue 18$b$ video signal information, is transmitted for display by the display unit during active horizontal lines (i.e., during intervals other than the vertical blanking interval 10). As noted, however, the horizontal time intervals 20 corresponding to the first few (e.g., 3–15) lines will be blanked and no video signal information 18$r$, 18$g$, 18$b$ is transmitted. Accordingly, during these time intervals 20, in between the horizontal synchronization pulses 14, other information, such as digitized data, can be transmitted.

Figure 2:
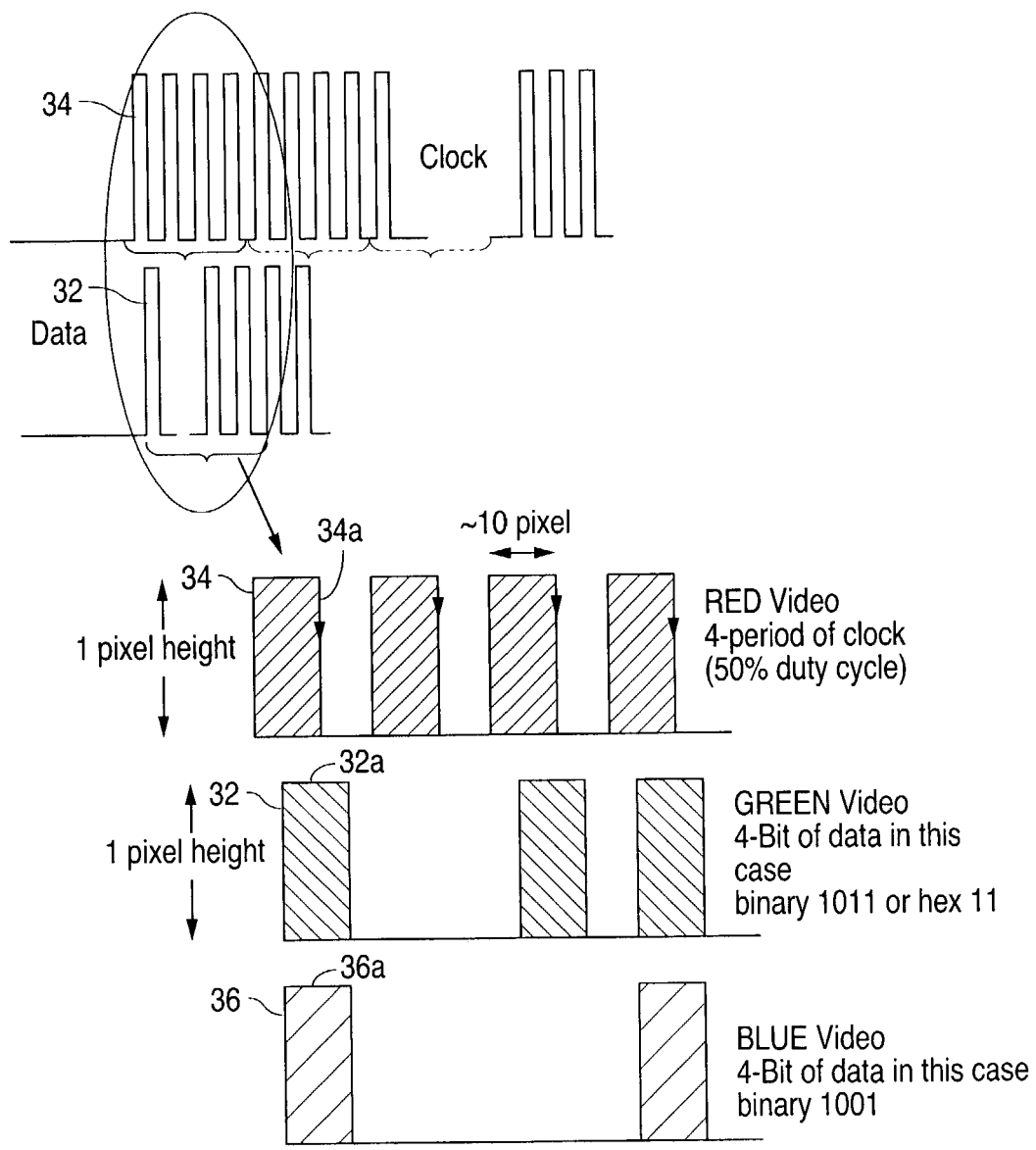
FIG. 2 is a signal diagram depicting clock and data signals to be multiplexed with component video signals in accordance with the presently claimed invention.

Referring to FIG. 2, two or three signals can be used to convey this other signal information: one or more data signals 32, 36 and a clock signal 34. The serial data signals 32, 36 are appropriately time-aligned with the clock signal 34 so as to have one of the clock signal edges, e.g., the falling edge 34$a$, aligned near the center 32$a$, 36$a$ of the data signal pulses for reliably capturing the correct data signal value. By way of an example, the red component video signal path can be used for the clock signal 34, while the green and blue component signal paths can be used for the data signals 32, 36. (It should be evident, however, that any combination of the component video signal paths can be used as desired for the data 32, 36 and clock 34 signals.)

Figure 3:
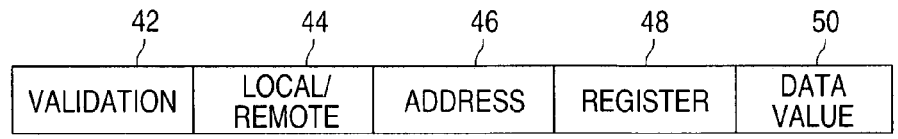
FIG. 3 illustrates one example format for a data packet for multiplexing with component video signals in accordance with the presently claimed invention.

Referring to FIG. 3, the serial data stream can be arranged in the form of data packets 40. Each such data packet 40 can include a number of components, such as sequences of validation data bits 42, a sequence of local/remote address information bits 44, additional address information bits 46, register information bits 48 and data value bits 50. It will be understood, however, that other, or additional, sequences of various types of information can also be included. Additionally, it will be understood that these and any other sequences of data bits can be arranged in any order deemed appropriate for a particular application.

In this particular example 40, the validation bits 42 can be used by the receiving system to determine whether the received data packet 40 has been accurately received and is, therefore, valid. The local/remote data 44 can be used to determine whether the ultimate destination for the data packet 40 or portions thereof is local or remote (discussed in more detail below). The address information 46 can be used to identify a specific portion of the receiving system, e.g., a specific integrated circuit (IC), for which the data packet 40 or portion thereof is intended. The register information 48 can be used to identify a specific register or registers within the destination circuitry identified by the address information 46. (One example of an application using such register information 48 is a widely used two-wire bus system commonly known as the I2C bus.) The actual data value information 50 is the primary data information conveyed by the data packet 40.

Figure 4:
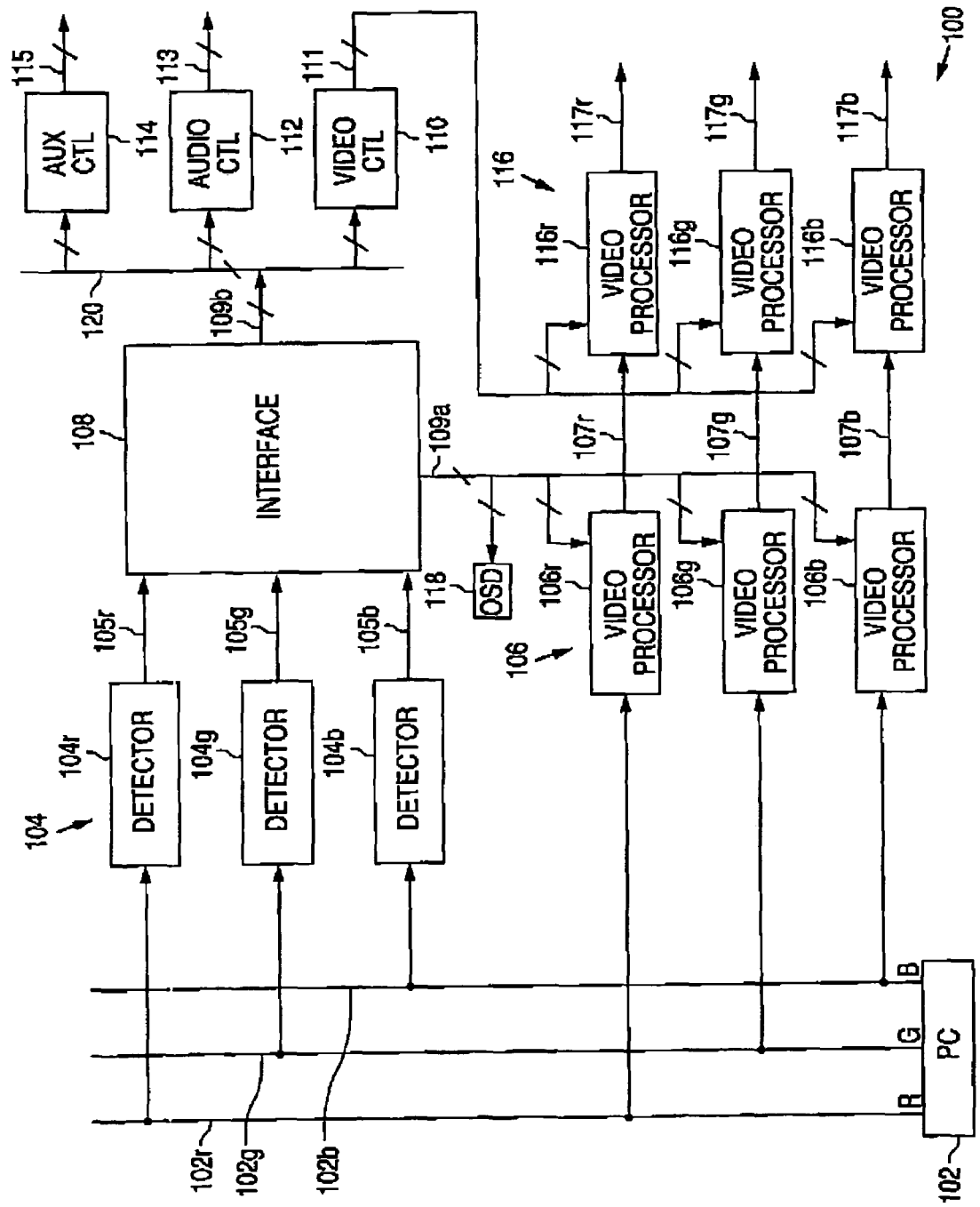
FIG. 4 is a block diagram of a video display interface controller for a host video display unit in accordance with one embodiment of the presently claimed invention.

Referring to FIG. 4, that portion of a video system 100 including a video display interface controller for a host video display unit in accordance with one embodiment of the present invention connects to the signal lines 102$r$, 102$g$, 102$b$ used for conveying the component video signals (e.g., red, green and blue) generated by a computer 102 for display by the display unit. These signals 102$r$, 102$g$, 102$b$ are multiplexed and include the component video signals 18$r$, 18$g$, 18$b$ (FIG. 1) multiplexed with data 40 (FIG. 3) as discussed above. Detector circuitry in the form of individual signal detectors 104$r$, 104$g$, 104$b$ detect these signals 102$r$, 102$g$, 102$b$ and extract the data and clock signals. For example, the red component signal 102$r$ can contain the clock signal, while the green component signal 102$g$ can contain the data signal. Accordingly, the first detected signal 105$r$ will be the detected clock signal, while the second detected signal 105$g$ will be the detected data signal. The blue component signal 102$b$ can contain other data as desired, thereby causing the third detected signal 105$b$ to contain such other data.

Video processor circuitry in the form of individual video processor circuits 106$r$, 106$g$, 106$b$ process the individual component signals (discussed in more detail below). The resulting processed video signals 107$r$, 107$g$, 107$b$ are further processed by further video processor circuitry in the form of additional individual video processor circuits 116$r$, 116$g$, 116$b$ to produce the final component video signals 117$r$, 117$g$, 117$b$ (discussed in more detail below) for display.

Interface circuitry 108 processes the detected signals 105$r$, 105$g$, 105$b$ to determine whether the data and control information contained in the data packet 40 is intended for use locally for the initial video processing circuitry 106, or remotely for other control circuitry 110, 112, 114 (discussed in more detail below). The interface circuitry 108 makes this determination using the local/remote address information 44 within the data packet 40 (FIG. 3). If the data is intended for local operations, control signals 109$a$ are provided to the video processor circuits 106$r$, 106$g$, 106$b$. Additionally, OSD circuitry 118 can be included for providing OSD display information. Examples of such "local" video control to be provided by the video processor circuits 106$r$, 106$g$, 106$b$ over the incoming video component signals 102$r$, 102$g$, 102$b$ are: contrast, brightness, gain, color balance and bias. (It will be understood that this list is not exhaustive and other controls may be exercised as well.)

If the interface circuitry 108 determines that the data 40 is intended for use by a remote control function, other control signals 109$b$ are provided for conveyance by a system bus 120 to make such signals 109$b$ available for other circuitry. For example, other video control circuitry 110, audio control circuitry 112 or other auxiliary control circuitry 114 may be designated by the address information 46 contained within the data packet 40. Accordingly, such data 40 is conveyed via the system bus 120 to the appropriate remote control circuitry 110, 112, 114 which then make available appropriate control signals 111, 113, 115.

For example, the remote video control circuitry 110 can provide control signals 111 for the downstream video processor circuits 116r, 116g, 116b for further processing of the initially processed video signals 107r, 107g, 107b. Examples of the image characteristics to be controlled by this subsequent video processing include, without limitation: pin cushion, geometry, height, width and centering.

Additionally, audio control circuitry 112 can be included to provide control signals 113 for audio circuitry (not shown) either internal or external to the host video display unit (not shown).

Auxiliary control circuitry 114 can also be included to provide auxiliary control signals 115 for other functions as desired.

Figure 5:
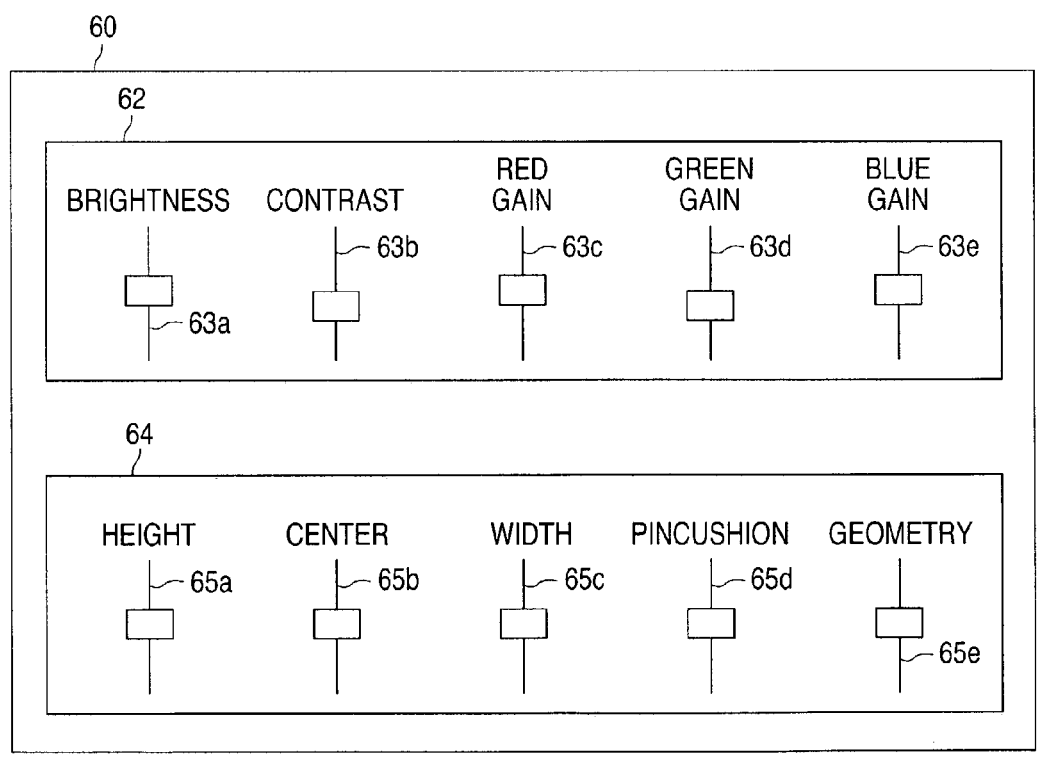
FIG. 5 illustrates how computer display windows can be displayed on a computer display screen as a user interface for controlling video signal and image display characteristics in accordance with the presently claimed invention.

Referring to FIG. 5, one example of an advantage provided by the present invention is the ability to control various characteristics of the video signal and image display remotely from the computer 102 (FIG. 4) as opposed to locally via some form of control panel or switches on the housing of the display unit itself (not shown). Within the main video image window 60, video control windows 62, 64 can be introduced in which various "slider" controls 63, 65 are displayed for controlling the various video signal or image display characteristics as discussed above (e.g., by pointing and clicking with a computer pointing device, or "mouse"). For example, in the first window 62, controls 63a, 63b can be exercised for controlling the brightness and contrast of the image, while in a second window 64, controls 65a, 65c can be exercised to control the height and width of the displayed image.

Figure 6:
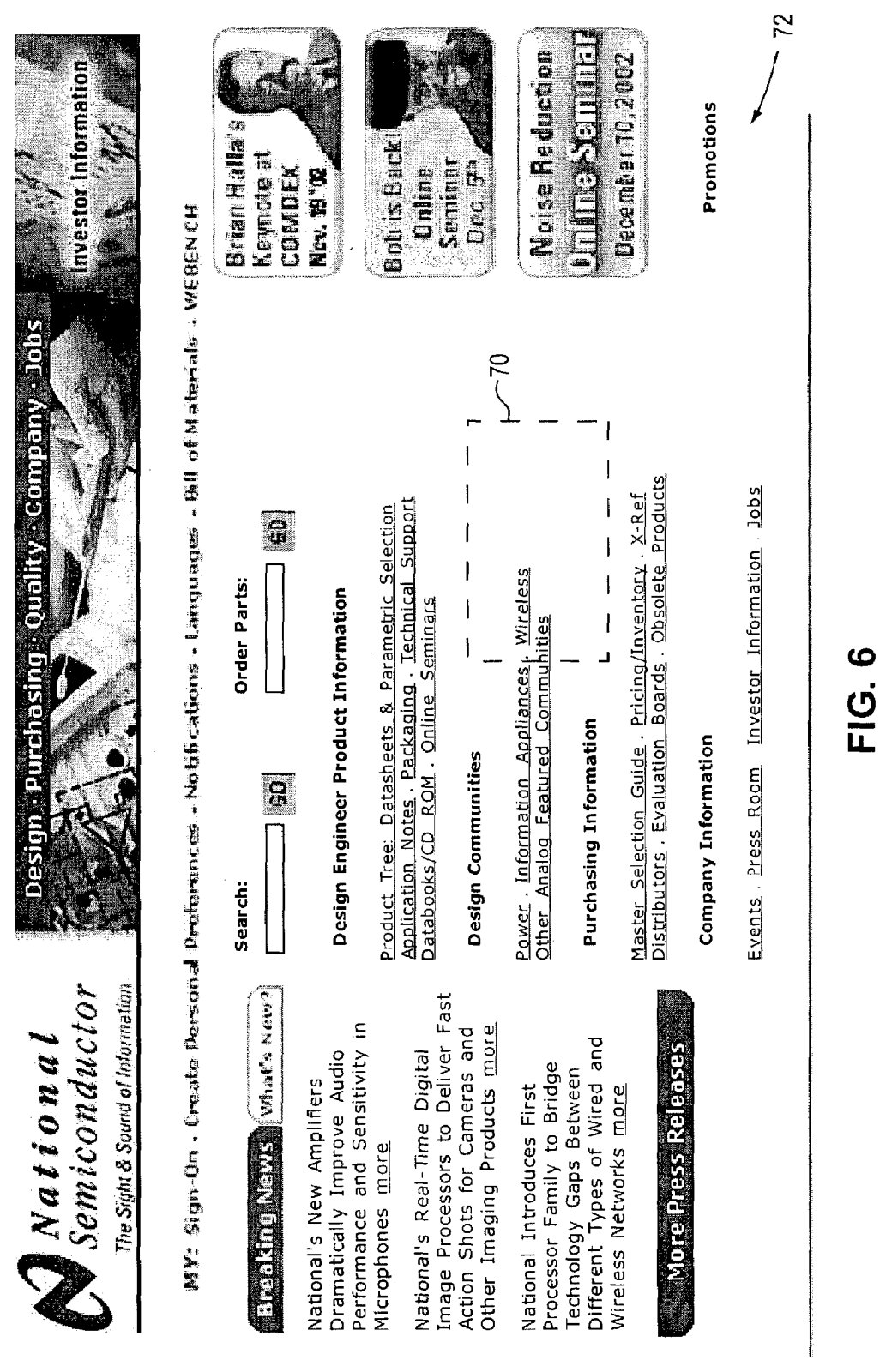

Referring to FIG. 6, an additional advantage provided by the present invention is the ability to remotely, e.g., via the computer 102 (FIG. 4), send image window information, multiplexed with the video component signals, to define a window 70 within the displayed image 72, e.g., a web page from the internet. The data packet 40 (FIG. 3) can include appropriate address and data information so as to define this window 70 in any of a number of ways as desired. For example, the data packet 40 can include data to define one of the corners of the window 70 and its height and width dimensions, thereby defining the horizontal and vertical coordinates of the window 70 such that the video processor circuitry 106, 116 appropriately processes the incoming component video signals corresponding to the video image information contained within the coordinates for that window 70. For example, the video information contained within that window 70 can be the OSD or other image information that is highlighted or processed in some other manner as desired to distinguish the video image information contained within the window 70 from the surrounding video image information outside the window 70.

Based upon the foregoing, it will be appreciated that, among other advantages, the present invention provide increased flexibility with respect to dynamic adjustment or manipulation of video signals and video image information, as well as reduction in costs by eliminating the need for dedicated, distinct circuitry within the host video display unit for controlling every possible video signal or image characteristic. Additionally, when OSD information is to be used, such OSD information can be dynamically multiplexed with the component video signals and provided in real time without requiring custom memory (e.g., read-only memory or ROM) to be maintained within the host video display unit for providing the OSD characters.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a video display interface controller for a host video display unit, comprising:

a first plurality of signal terminals that convey a plurality of multiplexed input signals including a plurality of component video signals and a first plurality of control signals, wherein said first plurality of control signals includes address information and data information, and said address information corresponds to at least one local address and at least one remote address;

a second plurality of signal terminals that convey a second plurality of control signals corresponding to a portion of said data information related to said at least one local address;

a third plurality of signal terminals that convey a third plurality of control signals including another portion of said data information and a portion of said address information corresponding to said at least one remote address;

interface circuitry, coupled to said first, second and third pluralities of signal terminals, that receives and processes said plurality of multiplexed input signals to provide said second and third pluralities of control signals; and first video control circuitry, coupled to said second plurality of signal terminals, that receives said second plurality of control signals and in response thereto provides a first plurality of video control signals; and first video processing circuitry, coupled to said first plurality of signal terminals and said first video control circuitry, that receives said plurality of multiplexed input signals and said first plurality of video control signals and in response thereto processes said plurality of component video signals to provide a plurality of processed video signals.

2. The apparatus of claim 1, further comprising second video processing circuitry, coupled to said third plurality of signal terminals and said first video processing circuitry, that receives said third plurality of control signals and in response thereto receives and further processes said plurality of processed video signals to provide at least one video display signal.

3. The apparatus of claim 1, further comprising second video control circuitry, coupled to said third plurality of signal terminals, that receives said third plurality of control signals and in response thereto provides a second plurality of video control signals.

4. The apparatus of claim 3, further comprising second video processing circuitry, coupled to said second video control circuitry and said first video processing circuitry, that receives said second plurality of video control signals and in response thereto receives and further processes said plurality of processed video signals to provide at least one video display signal.

5. An apparatus including a video display interface controller for a host video display unit, comprising:
- a first plurality of signal terminals that convey a plurality of multiplexed input signals including a plurality of component video signals and a first plurality of control signals, wherein said first plurality of control signals includes address information and data information, and said address information corresponds to at least one local address and at least one remote address;
- a second plurality of signal terminals that convey a second plurality of control signals corresponding to a portion of said data information related to said at least one local address;
- a third plurality of signal terminals that convey a third plurality of control signals including another portion of said data information and a portion of said address information corresponding to said at least one remote address;
- interface circuitry, coupled to said first, second and third pluralities of signal terminals, that receives and processes said plurality of multiplexed input signals to provide said second and third pluralities of control signals;
- first video control circuitry, coupled to said first and second pluralities of signal terminals, that receives said plurality of multiplexed input signals and said second plurality of control signals and in response thereto processes said plurality of component video signals to provide a plurality of processed video signals; and
- second video processing circuitry, coupled to said third plurality of signal terminals and said first video processing circuitry, that receives said third plurality of control signals and in response thereto receives and further processes said plurality of processed video signals to provide at least one video display signal.

6. An apparatus including a video display interface controller for a host video display unit, comprising:
- signal conveyance means for conveying a plurality of multiplexed input signals including a plurality of component video signals and a first plurality of control signals, wherein said first plurality of control signals includes address information and data information, and said address information corresponds to at least one local address and at least one remote address;
- processing means for processing said plurality of multiplexed input signals and generating
  - a second plurality of control signals corresponding to a portion of said data information related to said at least one local address; and
  - a third plurality of control signals including another portion of said data information and a portion of said address information corresponding to said at least one remote address;
- first video controller means for responding to said second plurality of control signals by generating a first plurality of video control signals; and
- first video processor means for responding to said first plurality of video control signals by processing said plurality of component video signals and generating a plurality of processed video signals.

7. The apparatus of claim 6, further comprising second video processor means for responding to said third plurality of control signals by processing said plurality of processed video signals and generating at least one video display signal.

8. The apparatus of claim 6, further comprising second video controller means for responding to said third plurality of control signals by generating a second plurality of video control signals.

9. The apparatus of claim 8, further comprising second video processor means for responding to said third plurality of control signals by processing said plurality of processed video signals and generating at least one video display signal.

10. An apparatus including a video display interface controller for a host video display unit, comprising:
- signal conveyance means for conveying a plurality of multiplexed input signals including a plurality of component video signals and a first plurality of control signals, wherein said first plurality of control signals includes address information and data information, and said address information corresponds to at least one local address and at least one remote address;
- processing means for processing said plurality of multiplexed input signals and generating
  - a second plurality of control signals corresponding to a portion of said data information related to said at least one local address; and
  - a third plurality of control signals including another portion of said data information and a portion of said address information corresponding to said at least one remote address;
- first video processor means for responding to said first plurality of video control signals by processing said plurality of component video signals and generating a plurality of processed video signals; and
- second video processor means for responding to said third plurality of control signals by processing said plurality of processed video signals and generating at least one video display signal.

* * * * *